United States Patent

Kitagawa et al.

[11] Patent Number: 5,385,030
[45] Date of Patent: Jan. 31, 1995

[54] AIR CONDITIONER

[75] Inventors: Koichi Kitagawa; Kazuo Saito, both of Kanagawa; Toshio Otaka, Tokyo; Toshihiro Yamamoto; Yoshihiro Ito, both of Kanagawa, all of Japan

[73] Assignee: Kabushiki Kaisha Toshiba, Kawasaki, Japan

[21] Appl. No.: 208,223

[22] Filed: Mar. 10, 1994

[30] Foreign Application Priority Data

Mar. 29, 1993 [JP] Japan ................... 5-069715

[51] Int. Cl.⁶ ............................................ F25B 39/00
[52] U.S. Cl. ........................................ 62/160; 62/181; 62/184; 62/186; 62/114
[58] Field of Search ................ 62/181, 179, 180, 183, 62/184, 114, 174, 89, 186, 228.4, 160

[56] References Cited

U.S. PATENT DOCUMENTS

| | | | |
|---|---|---|---|
| 3,390,538 | 7/1968 | Miller | 62/181 |
| 3,390,539 | 7/1968 | Miner | 62/181 X |
| 4,364,237 | 12/1982 | Cooper et al. | 62/160 |
| 4,936,107 | 6/1990 | Kitagaki et al. | 62/184 |
| 5,138,844 | 8/1992 | Clanin et al. | 62/89 |

FOREIGN PATENT DOCUMENTS

| | | |
|---|---|---|
| 62-35589 | 8/1987 | Japan . |
| 62-255071 | 11/1987 | Japan . |
| 63-297947 | 12/1988 | Japan . |

*Primary Examiner*—Harry B. Tanner
*Attorney, Agent, or Firm*—Foley & Lardner

[57] ABSTRACT

An air conditioner employs a refrigerating cycle involving a compressor 1, an outdoor heat exchanger 5, an indoor heat exchanger 9, an expansion valve 7, and a non-azeotropic coolant mixture composed of high and low boiling coolants sealed in the refrigerating cycle. The outdoor heat exchanger 5 is provided with a first blower 15 and a second blower 17. A speed controller 18 drives and controls the first, and second blowers 15 and 17. The speed controller 18 achieves a first mode to decrease an air quantity to part of the outdoor heat exchanger located on the upstream side of a flow of the coolant smaller than an air quantity to part of the outdoor heat exchanger located on the downstream side of the flow of the coolant, and a second mode to increase the air quantity to the upstream side of the outdoor heat exchanger greater than the air quantity to the downstream side of the outdoor heat exchanger.

7 Claims, 4 Drawing Sheets

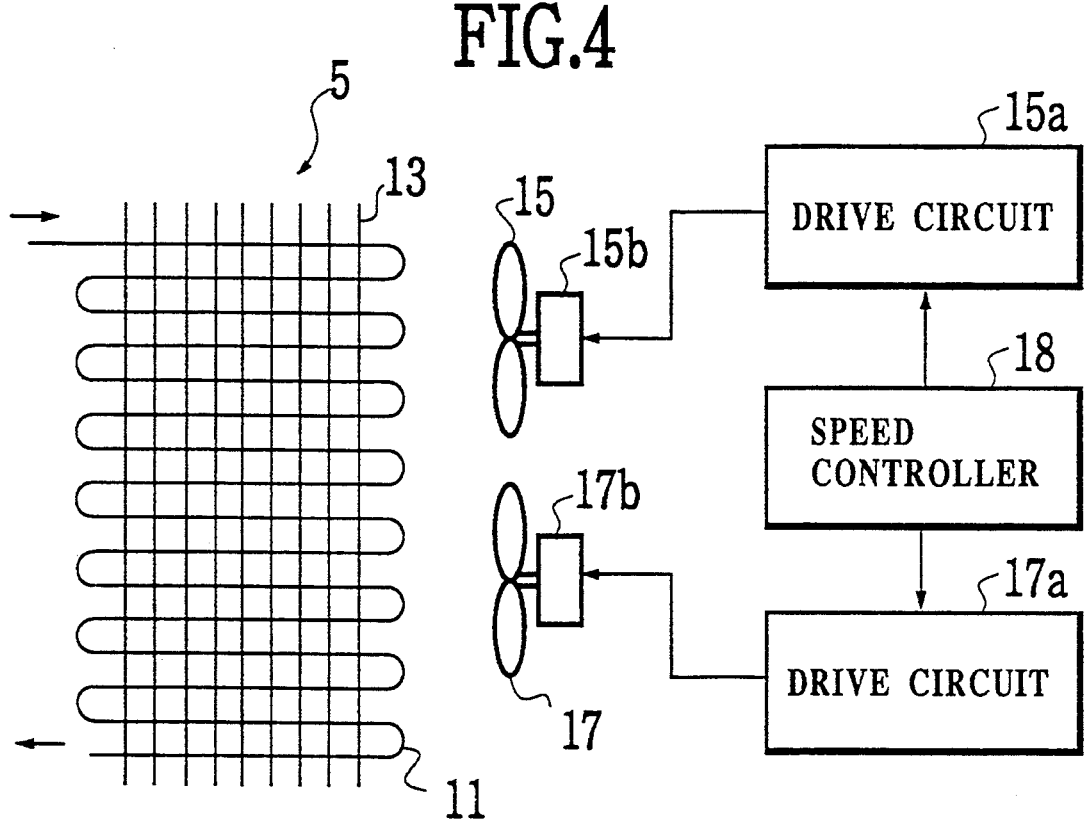

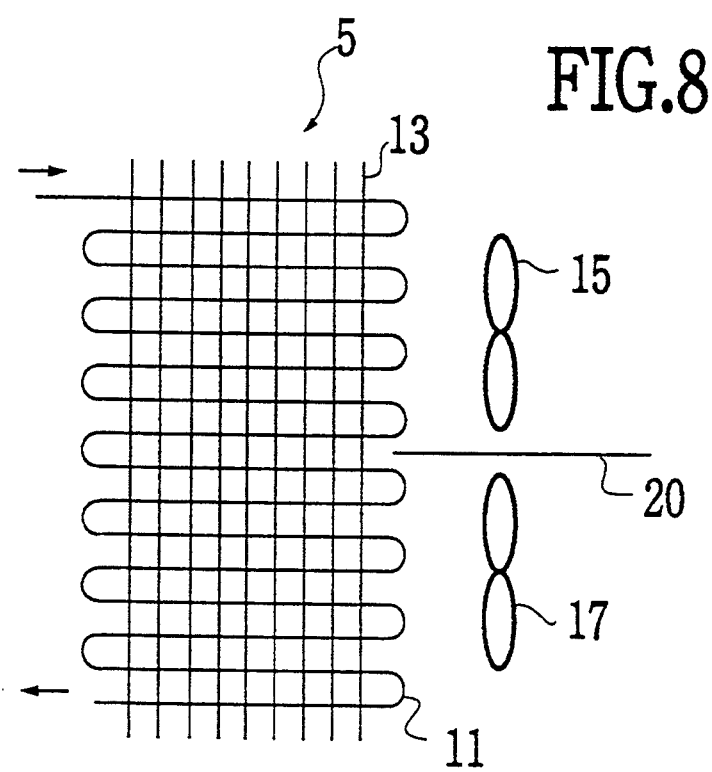
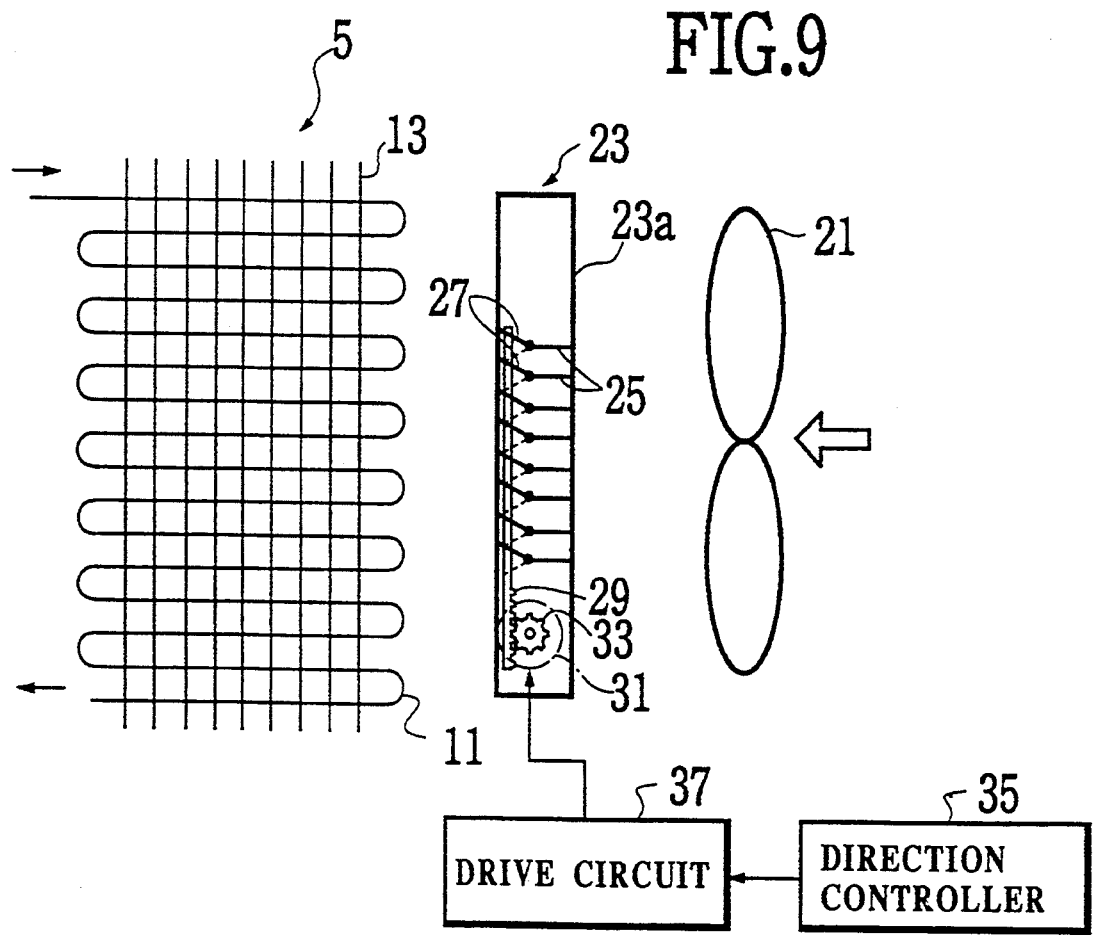

AIR CONDITIONER

BACKGROUND OF THE INVENTION

1. Field of the Invention

The present invention relates to an air conditioner with a refrigerating cycle employing a non-azeotropic coolant mixture composed of high and low boiling coolants, and particularly, to an air conditioner efficiently operating the refrigerating cycle by effectively controlling a temperature gradient due to phase changes characteristic to the non-azeotropic coolant mixture.

2. Description of the Prior Art

FIGS. 1 and 2 are Mollier charts showing refrigerating cycles of air conditioners employing a heat pump that carries out both heating and cooling operations. The refrigerating cycle of FIG. 1 employs a single coolant and the refrigerating cycle of FIG. 2 employs an azeotropic coolant mixture.

The coolant is condensed by an outdoor heat exchanger when carrying out the cooling operation and is evaporated by the same when carrying out the heating operation. When the coolant is condensed or evaporated, the phase of the coolant changes.

When the phase of the single coolant of FIG. 1 changes, the pressure and temperature thereof are unchanged as indicated with a dotted line T showing an equal temperature.

When the phase of the non-azeotropic coolant mixture of FIG. 2 changes, the temperature thereof changes as indicated with dotted lines T1 and T2 showing equal temperatures (T1<T2), respectively. Namely, the non-azeotropic coolant mixture demonstrates a temperature gradient when the composition of the non-azeotropic coolant mixture changes according to the phase change. The temperature gradient is dependent on the composition and mixing ratio of the non- azeotropic coolant mixture. The temperature gradient during an air-conditioning operation is, for example, about five degrees of centigrade between the inlet and outlet of the outdoor heat exchanger.

Conventional air conditioners employing the non-azeotropic coolant mixture, however, do not effectively utilize such a temperature gradient.

SUMMARY OF THE INVENTION

An object of the present invention is to efficiently operate a refrigerating cycle of an air conditioner employing a non-azeotropic coolant mixture by effectively controlling a temperature gradient caused by a phase change in the coolant in an outdoor heat exchanger of the air conditioner.

In order to accomplish the object, a first aspect of the present invention provides an air conditioner employing a refrigerating cycle involving a compressor, an outdoor heat exchanger, an indoor heat exchanger, an expansion mechanism, and a non-azeotropic coolant mixture serving as a working fluid sealed in the refrigerating cycle. A plurality of blowers are arranged for the outdoor heat exchanger along a flow of the coolant. An air quantity changer is arranged for changing a ratio of air quantities provided by the blowers to the outdoor heat exchanger.

The air quantity changer achieves a first mode and a second mode. The first mode reduces an air quantity to the upstream side of the outdoor heat exchanger smaller than an air quantity to the downstream side thereof. The second mode increases the air quantity to the upstream side of the outdoor heat exchanger greater than the air quantity to the downstream side thereof.

A second aspect of the present invention provides an air conditioner employing a refrigerating cycle involving a compressor, an outdoor heat exchanger, an indoor heat exchanger, an expansion mechanism, and a non-azeotropic coolant mixture serving as a working fluid sealed in the refrigerating cycle. The outdoor heat exchanger is provided with a blower. An air quantity changing mechanism having louvers is arranged between the blower and the outdoor heat exchanger. The air quantity changing mechanism is shiftable to a state to reduce an air quantity to the upstream side of the outdoor heat exchanger smaller than an air quantity to the downstream side thereof, and to a state to increase the air quantity to the upstream side of the outdoor heat exchanger larger than the air quantity to the downstream side thereof. The air quantity changing mechanism is controlled by an air quantity changer, which achieves a first mode corresponding to the state to reduce the air quantity to the upstream side of the outdoor heat exchanger, and a second mode corresponding to the state to increase the air quantity to the upstream side of the outdoor heat exchanger.

The air quantity changer according to the first aspect of the present invention changes air quantities to the upstream and downstream sides of the outdoor heat exchanger by controlling air quantities provided by the blowers. The air quantity changer according to the second aspect of the present invention changes air quantities to the upstream and downstream sides of the outdoor heat exchanger by controlling the air quantity changing mechanism in front of the blower.

When the air quantity changer select's the second mode to increase the air quantity to the upstream side of the outdoor heat exchanger greater than the air quantity to the downstream side thereof, total heat exchange capacity becomes larger because the temperature of the upstream side of the outdoor heat exchanger greatly differs from an ambient temperature. This results in increasing the performance of the refrigerating cycle. Accordingly, the second mode is effective when starting the air conditioner.

When the air quantity changer selects the first mode to decrease the air quantity to the upstream side of the outdoor heat exchanger smaller than the air quantity to the downstream side thereof, heat exchange capacity on the upstream side decreases to lower the operation performance of the refrigerating cycle. Accordingly, the first mode is useful during a control operation in which no large performance of the air conditioner is needed.

These and other objects, features and advantages of the present invention will be more apparent from the following detailed description of preferred embodiments in conjunction with the accompanying drawings.

BRIEF DESCRIPTION OF THE DRAWINGS

FIG. 4 shows an outdoor heat exchanger and its peripheral units of the air conditioner of FIG. 3;

FIG. 5 is a table showing operation modes of the air conditioner of FIG. 3;

FIG. 8 shows the outdoor heat exchanger of FIG. 4 with modified peripheral units; and FIG. 9 shows an outdoor heat exchanger and its peripheral units according to a second embodiment of the present invention.

DETAILED DESCRIPTION OF THE EMBODIMENTS

The embodiments of the present invention will be explained with reference to the drawings.

Figure 3:
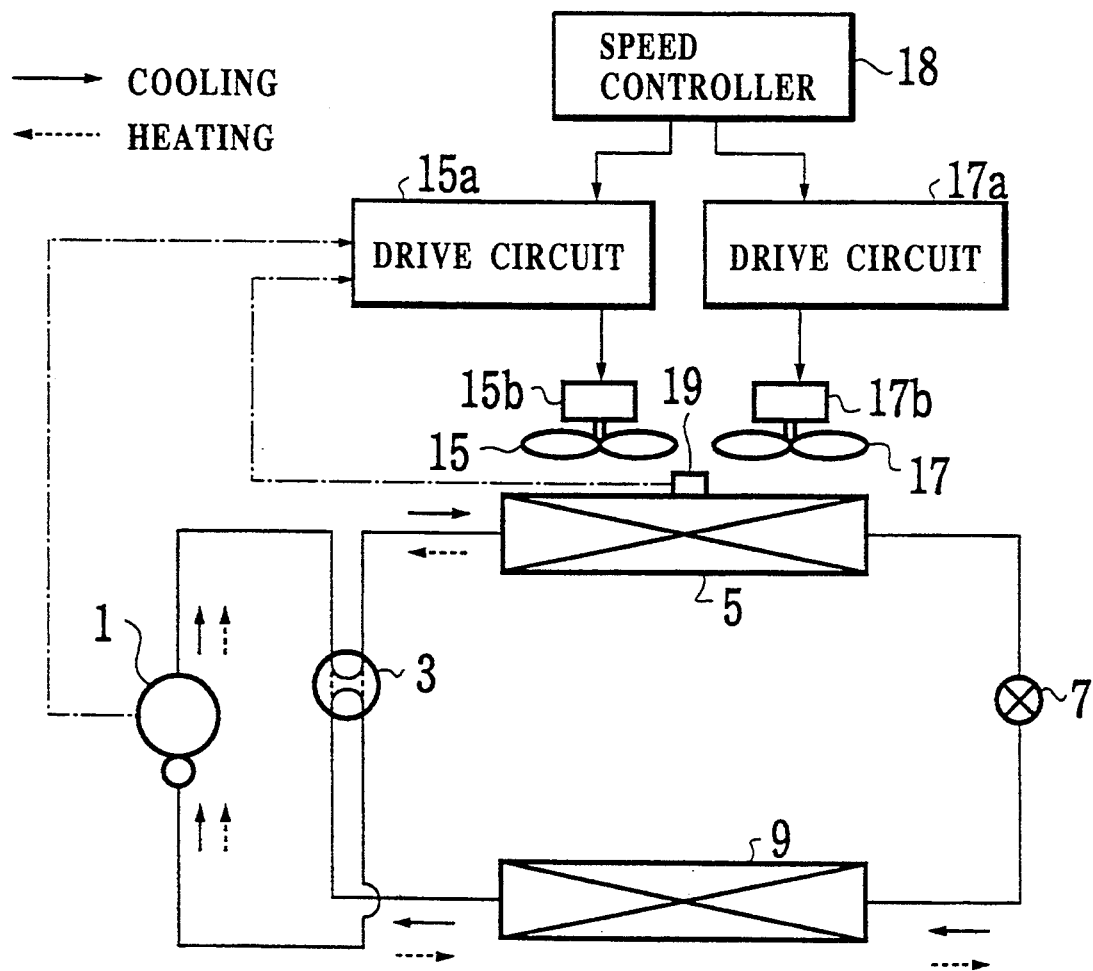
FIG. 3 shows a refrigerating cycle of an air conditioner according to a first embodiment of the present invention.

FIG. 3 shows a refrigerating cycle of an air conditioner according to the first embodiment of the present invention. A non-azeotropic coolant mixture composed of high and low boiling coolants is sealed in the refrigerating cycle.

The refrigerating cycle involves a compressor 1, a four-way valve 3 for changing the direction of the coolant depending on cooling and heating operations, an outdoor heat exchanger 5 serving as a condenser during the cooling operation and as an evaporator during the heating operation, an expansion valve 7 serving as an expansion mechanism for reducing the pressure of the coolant, and an indoor heat exchanger 9 serving as an evaporator during the cooling operation and a condenser during the heating operation.

A flow of the coolant during the cooling operation is indicated with arrow marks with continuous lines, and a flow of the coolant during the heating operation is indicated with arrow marks with dotted lines. In the heating operation, the coolant from the compressor 1 flows through the four-way valve 3, indoor heat exchanger 9, expansion valve 7, outdoor heat exchanger 5, and the four-way valve 3 and returns to the compressor 1.

In FIG. 4, the outdoor heat exchanger 5 has coolant piping 11 and heat radiation fins 13 attached to the piping 11. First and second blowers 15 and 17 are adjacent to the outdoor heat exchanger 5. Along a flow of the coolant during the cooling operation, the first blower 15 is on the upstream side of the heat exchanger 5, and the second blower 17 is on the downstream side thereof. The first blower 15 is driven by a motor 15$b$, which is controlled by a drive circuit 15$a$. The second blower 17 is driven by a motor 17$b$, which is controlled by a drive circuit 17$a$. A speed controller 18 separately controls the drive circuits 15$a$ and 17$a$, to independently control the speeds of the motors 15$b$ and 17$b$, i.e., the blowers 15 and 17. The speed controller 18 serves as an air quantity changer for changing air quantities provided by the blowers 15 and 17.

FIG. 5 is a table showing modes A and B achieved by the speed controller 18. In the mode A, the first blower 15 provides a small air quantity and the second blower 17 a large air quantity. In the mode B, the first blower 15 provides a large air quantity and the second blower 17 a small air quantity. One of the modes A and B is selected according to the operating frequency of the compressor 1 during the cooling operation, and during the heating operation, the temperature of the outdoor heat exchanger 5 detected by a temperature sensor 19 attached to the outdoor heat exchanger 5.

In the cooling operation, the first blower 15 comes on the upstream side of the coolant flow and the second blower 17 on the downstream side thereof. In this case, the mode A corresponds to the first mode in which the air quantity to the upstream side of the outdoor heat exchanger 5 is smaller than the air quantity to the downstream side thereof. This mode needs a little power so that it is appropriate for a control operation. The mode B corresponds to the second mode in which the air quantity to the upstream side is greater than the air quantity to the downstream side. This mode is appropriate to start the air conditioner with large air-conditioning load and cooling capacity.

In the heating operation, the coolant in the outdoor hat exchanger 5 flows oppositely to the cooling operation. Accordingly, the second blower 17 comes on the upstream side of the coolant flow and the first blower 15 on the downstream side thereof. In this case, the mode A corresponds to the second mode in which the air quantity to the upstream side of the outdoor heat exchanger 5 is greater than the air quantity to the downstream side thereof, and the mode B corresponds to the first mode in which the air quantity to the upstream side is smaller than the air quantity to the downstream side.

Figure 6:
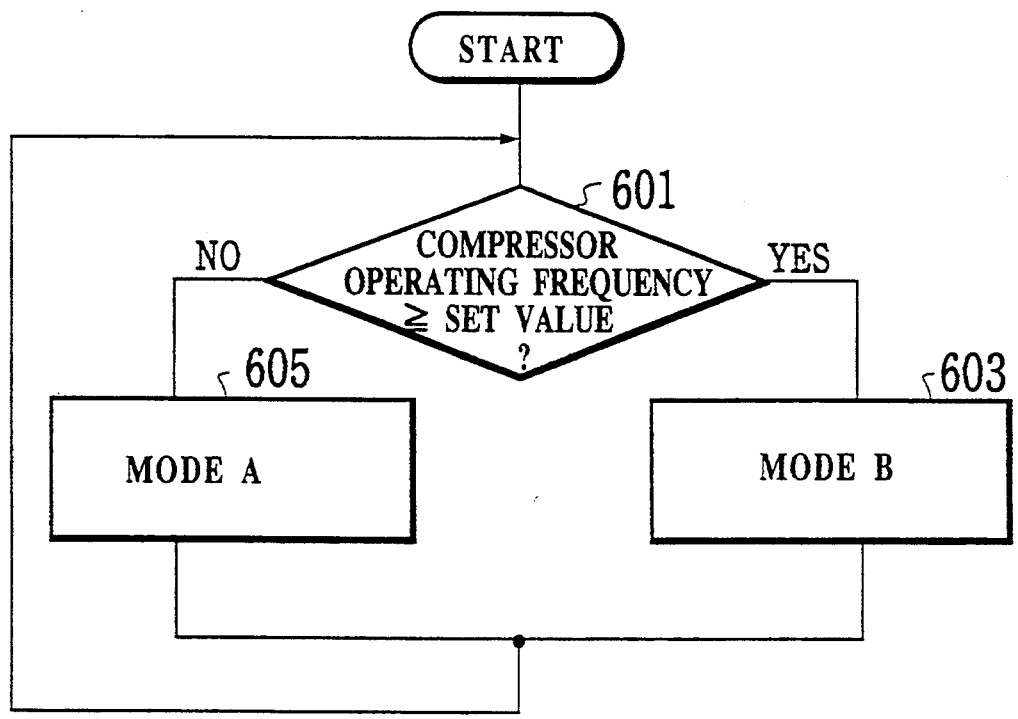
FIG. 6 is a flowchart showing steps of controlling a cooling operation of the air conditioner of FIG. 3.

An operation of the speed controller 18 during the cooling operation will be explained with reference to a flowchart of FIG. 6.

In step 601, the speed controller 18 determines whether the operating frequency of the compressor 1 is greater than a predetermined value. If YES, the speed controller 18 determines it is the start of the air conditioner, and in step 603, selects the mode B to provide large cooling capacity.

Figure 1:
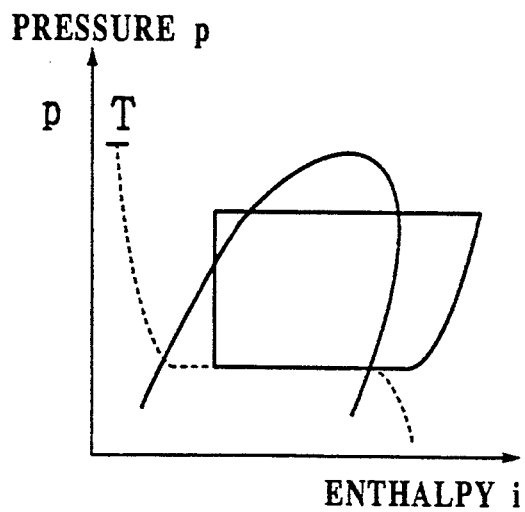
FIG. 1 is a Mollier chart showing a refrigerating cycle employing a single coolant.
Figure 2:
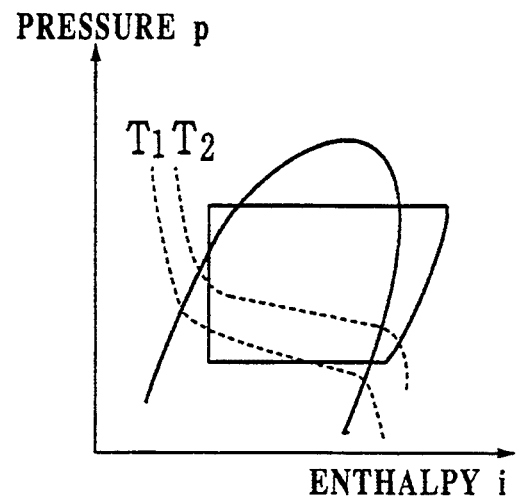
FIG. 2 is a Mollier chart showing a refrigerating cycle employing a non-azeotropic coolant mixture.

During the cooling operation, the compressor 1 provides a high-temperature high-pressure coolant to exchange heat with atmosphere through the outdoor heat exchanger 5. As shown in the Mollier chart of FIG. 2, the non-azeotropic coolant mixture shows a temperature gradient between the upstream and downstream sides of the outdoor heat exchanger 5. Since the mode B increases an air quantity from the first blower 15, a large quantity of air is supplied to the upstream side of the outdoor heat exchanger 5 where there is a large temperature difference between the coolant and the atmosphere. As a result, a condensation rate of the coolant in the upstream side of the outdoor heat exchanger 5 is increased to increase the total condensation of the coolant through the exchanger 5. This results in increasing the performance of the refrigerating cycle, and therefore, the mode B is appropriate for the start of the air conditioner.

If the operating frequency of the compressor 1 is smaller than the predetermined value in the step 601, the speed controller 18 determines it is a control operation, and in 605, selects the mode A to achieve smaller cooling capacity. The mode A reduces an air quantity from the first blower 15 to the upstream side of the outdoor heat exchanger 5 smaller than an air quantity from the second blower 17 to the downstream side of the heat exchanger 5. This reduces heat exchange capacity on the high-pressure upstream side of the heat exchanger 5, to lower pressure on the upstream side and reduce a compressor input in the refrigerating cycle.

In this way, a ratio of air quantities or the air quantities themselves from the blowers 15 and 17 are changed to efficiently control the operating conditions of the refrigerating cycle employing the non-azeotropic coolant mixture, depending on whether the air conditioner is at the start or in the control operation.

The modes A and B may be changed from one to another according to not only the operating frequency of the compressor 1 but also an ambient temperature, a room temperature, the set temperature of the air conditioner, the temperature and pressure of the outdoor heat exchanger 5, the quantity of a current, the amount of electric energy, or a combination of them.

Figure 7:
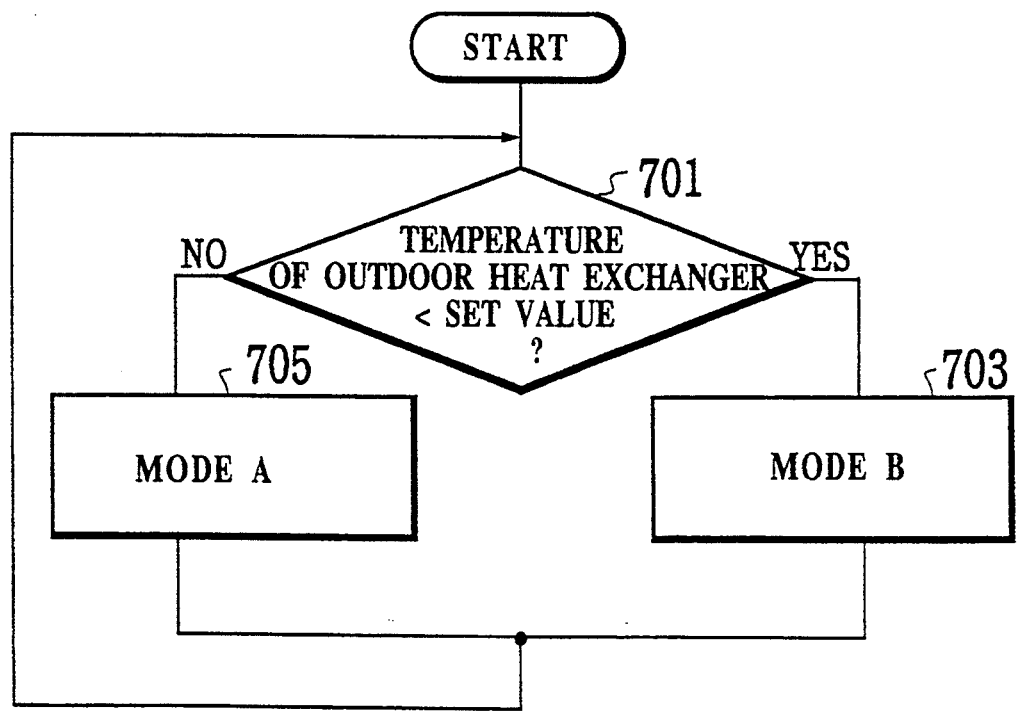
FIG. 7 is a flowchart showing steps of controlling a heating operation of the air conditioner of FIG. 3.

FIG. 7 is a flowchart showing the heating operation. In step 701, the speed controller 18 determines whether the temperature of the outdoor heat exchanger 5 is below a predetermined value. If YES, the speed controller 18 determines that the outdoor heat exchanger 5 will be frosted, and in 703, selects the mode B to make the first blower 15 provide a large quantity of air to the downstream side of the outdoor heat exchanger 5.

In the heating operation, the indoor heat exchanger 9 condenses the coolant into a liquid state, which is supplied to the outdoor heat exchanger 5 through the expansion valve 7. The outdoor heat exchanger 5 evaporates the coolant so that the coolant exchanges heat with atmosphere. At this time, a temperature at an inlet of the outdoor heat exchanger 5 is lower than a temperature at an outlet thereof by several degrees, as is apparent in the Molller chart of FIG. 2 for the non-azeotropic coolant mixture. In the case of the single coolant, an evaporation temperature is about 0 degrees centigrade. In the case of the non-azeotropic coolant mixture, the inlet temperature of the outdoor heat exchanger 5 may become minus two degrees centigrade while the outlet temperature thereof is about plus three degrees centigrade. Even under operating conditions that may cause no frost with the single coolant, the inlet of the outdoor heat exchanger 5 may be frosted with the non-azeotropic coolant mixture. Accordingly, the air quantity to the downstream side of the outdoor heat exchanger 5 is increased if the temperature of the outdoor heat exchanger 5 is below the predetermined value, to prevent the frosting while maintaining total heat exchange capacity.

If the temperature of the outdoor heat exchanger 5 is above the predetermined value, i.e., if there is no fear of frosting, the speed controller 18 selects, in step 705, the mode A to increase the air quantity provided by the second blower 17 to the inlet side of the outdoor heat exchanger 5 where the evaporation temperature of the coolant is low relative to the ambient temperature. This results in increasing heat exchange capacity and operation performance.

The modes A and B are selectable according to not only the temperature of the outdoor heat exchanger 5 but also an ambient temperature and the operating conditions such as suction pressure, operating frequency, current, and power consumption of the compressor 1.

FIG. 8 shows a modification of the first embodiment of FIG. 4. A partition 20 is arranged between the first and second blowers 15 and 17. The partition 20 clearly separates different air quantities to the upstream and downstream sides of the outdoor heat exchanger 5, to further improve the operating efficiency of the refrigerating cycle.

FIG. 9 shows an outdoor heat exchanger 5 and its peripheral units according to the second embodiment of the present invention. The outdoor heat exchanger 5 is provided with a blower 21 and a louver mechanism 23 arranged between the blower 21 and the outdoor heat exchanger 5. The louver mechanism 28 has a frame 28a and louvers 25 fixed to the frame 23a on the blower 21 side. Tips of the louvers 25 on the outdoor heat exchanger 5 side are movable between a position indicated with continuous lines and a position indicated with dotted lines.

The louvers 27 are connected to a rack 29 engaging with a pinion 83. The pinion 88 is connected to a motor 31 that is rotatable in forward and reverse directions. The motor 31 is driven by a drive circuit 37, which is controlled by a direction controller 35 serving as an air quantity changer.

When the louvers 27 are driven to the dotted line position, the first mode is set to increase an air quantity to the downstream side of the outdoor heat exchanger 5 during a cooling operation. During a heating operation, the same position corresponds to the second mode to increase an air quantity to the upstream side of the outdoor heat exchanger 5. Accordingly, the dotted line position corresponds to the mode A of FIG. 5.

When the louvers 27 are driven to the continuous line position, the second mode is set during the cooling operation, to increase the air quantity to the upstream side of the outdoor heat exchanger 5. During the heating operation, the same position corresponds to the first mode to increase the air quantity to the downstream side of the outdoor heat exchanger 5. Accordingly, the continuous line position corresponds to the mode B of FIG. 5.

The modes A and B are switched from one to another in the same manner as described with reference to the flowcharts of FIGS. 6 and 7 of the first embodiment, thereby efficiently operating the refrigerating cycle.

In summary, the present invention achieves the second mode to increase an air quantity supplied to part of an outdoor heat exchanger located on the upstream side of a coolant flow larger than an air quantity to part of the outdoor heat exchanger located on the downstream side of the coolant flow. This mode increases total heat exchange capacity because a temperature difference between the outdoor heat exchanger and atmosphere is large on the upstream side, thereby increasing the operation performance of the refrigerating cycle.

The present invention achieves the first mode to decrease the air quantity to the upstream side of the outdoor heat exchanger smaller than the air quantity to the downstream side of the outdoor heat exchanger. This results in reducing the heat exchange capacity on the upstream side, to lower the operation performance of the refrigerating cycle. This mode, therefore, is appropriate for a control operation that does not require large operation performance.

In this way, the present invention efficiently operates a refrigerating cycle employing a non-azeotropic coolant mixture by effectively utilizing a temperature gradient caused when the phase of the coolant changes.

Various modifications will become possible for those skilled in the art after receiving the teachings of the present disclosure without departing from the scope thereof.

What is claimed is:

1. An air conditioner comprising:
   (a) a refrigerating cycle involving a compressor, an outdoor heat exchanger, an indoor heat exchanger, an expansion mechanism, and a non-azeotropic coolant mixture serving as a working fluid sealed in the refrigerating cycle;
   (b) a plurality of blowers provided for the outdoor heat exchanger along a flow of the coolant;
   (c) air quantity changing means for changing a ratio of air quantities provided by said blowers; and (d) said air quantity changing means achieving a first mode for reducing an air quantity to part of the outdoor heat exchanger located on the upstream side of the flow of the coolant smaller than an air quantity to part of the outdoor heat exchanger located on the downstream side of the flow of the coolant, and a second mode to increase the air quantity to the upstream side of the outdoor heat exchanger larger than the air quantity to the downstream side of the outdoor heat exchanger.

2. The air conditioner according to claim 1, wherein said air quantity changing means selects one of the first and second modes according to the operating frequency of the compressor.

3. The air conditioner according to claim 2, wherein said air quantity changing means selects, in a cooling operation, the first mode if the operating frequency of the compressor is below a predetermined value, and the second mode if the operating frequency is above the predetermined value.

4. The air conditioner according to claim 1, wherein the air quantity changing means selects one of the first and second modes according to the temperature of the outdoor heat exchanger.

5. The air conditioner according to claim 4, wherein the air quantity changing means selects, in a heating operation, the first mode if the temperature of the outdoor heat exchanger is below a predetermined value, and the second mode if the temperature of the outdoor heat exchanger is above the predetermined value.

6. The air conditioner according to claim 1, further comprising a partition arranged between the blowers.

7. An air conditioner comprising:

(a) a refrigerating cycle involving a compressor, an outdoor heat exchanger, an indoor heat exchanger, an expansion mechanism, and a non-azeotropic coolant mixture serving as a working fluid sealed in the refrigerating cycle;

(b) a blower provided for the outdoor heat exchanger;

(c) an air quantity changing mechanism arranged between the outdoor heat exchanger and said blower, for achieving a state to reduce an air quantity to part of the outdoor heat exchanger located on the upstream side of a flow of the coolant smaller than an air quantity to part of the outdoor heat exchanger located on the downstream side of the flow of the coolant, and a state to increase the air quantity to the upstream side of the outdoor heat exchanger greater than the air quantity to the downstream side of the outdoor heat exchanger; and (d) air quantity changing means for controlling the operation of the air quantity changing mechanism to a first mode corresponding to the state to reduce the air quantity to the upstream side of the outdoor heat exchanger and a second mode corresponding to the state to increase the air quantity to the upstream side of the outdoor heat exchanger.

* * * * *